US011543585B2

United States Patent
Shimokawa et al.

(10) Patent No.: US 11,543,585 B2
(45) Date of Patent: *Jan. 3, 2023

(54) ELECTRONIC DEVICE COMPRISING ILLUMINATION DEVICE INCLUDING SECOND LIGHT GUIDE FORMED IN AN OPENING

(71) Applicant: Japan Display Inc., Tokyo (JP)

(72) Inventors: Hiroyuki Shimokawa, Tokyo (JP); Nobuyuki Suzuki, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/491,667

(22) Filed: Oct. 1, 2021

(65) Prior Publication Data

US 2022/0019016 A1 Jan. 20, 2022

Related U.S. Application Data

(63) Continuation of application No. PCT/JP2020/007809, filed on Feb. 26, 2020.

(30) Foreign Application Priority Data

Apr. 3, 2019 (JP) ............................ JP2019-071355

(51) Int. Cl.

*F21V 8/00* (2006.01)
*G02F 1/13357* (2006.01)

(52) U.S. Cl.

CPC ......... *G02B 6/0075* (2013.01); *G02B 6/0055* (2013.01); *G02B 6/0066* (2013.01); *G02B 6/0076* (2013.01); *G02B 6/0078* (2013.01); *G02F 1/1336* (2013.01)

(58) Field of Classification Search

CPC .. G02B 6/0075; G02B 6/0076; G02B 6/0078; G02B 6/008

See application file for complete search history.

(56) References Cited

U.S. PATENT DOCUMENTS

| | | | | |
|---|---|---|---|---|
| 11,256,024 | B2 * | 2/2022 | Hasegawa | G02F 1/133614 |
| 2006/0262564 | A1 * | 11/2006 | Baba | G02B 6/0021 362/616 |
| 2009/0296026 | A1 * | 12/2009 | Bae | G02F 1/133615 362/617 |
| 2017/0053592 | A1 | 2/2017 | Shin et al. | |
| 2021/0263375 | A1 * | 8/2021 | Hasegawa | G02F 1/1333 |
| 2022/0026625 | A1 * | 1/2022 | Shimokawa | G02B 6/0083 |

FOREIGN PATENT DOCUMENTS

| | | |
|---|---|---|
| JP | 2017-40908 A | 2/2017 |

* cited by examiner

*Primary Examiner* — Keith G. Delahoussaye
(74) *Attorney, Agent, or Firm* — Maier & Maier, PLLC

(57) ABSTRACT

According to one embodiment, an electronic device includes a liquid crystal panel, an illumination device, and a light reflecting material. The illumination device includes a first light guide having an opening, a first light source configured to irradiate the first light guide with light, a second light guide formed in the opening, and a second light source configured to irradiate the second light guide with light. The light reflecting material is located between the first light guide and the second light guide in the opening.

9 Claims, 9 Drawing Sheets

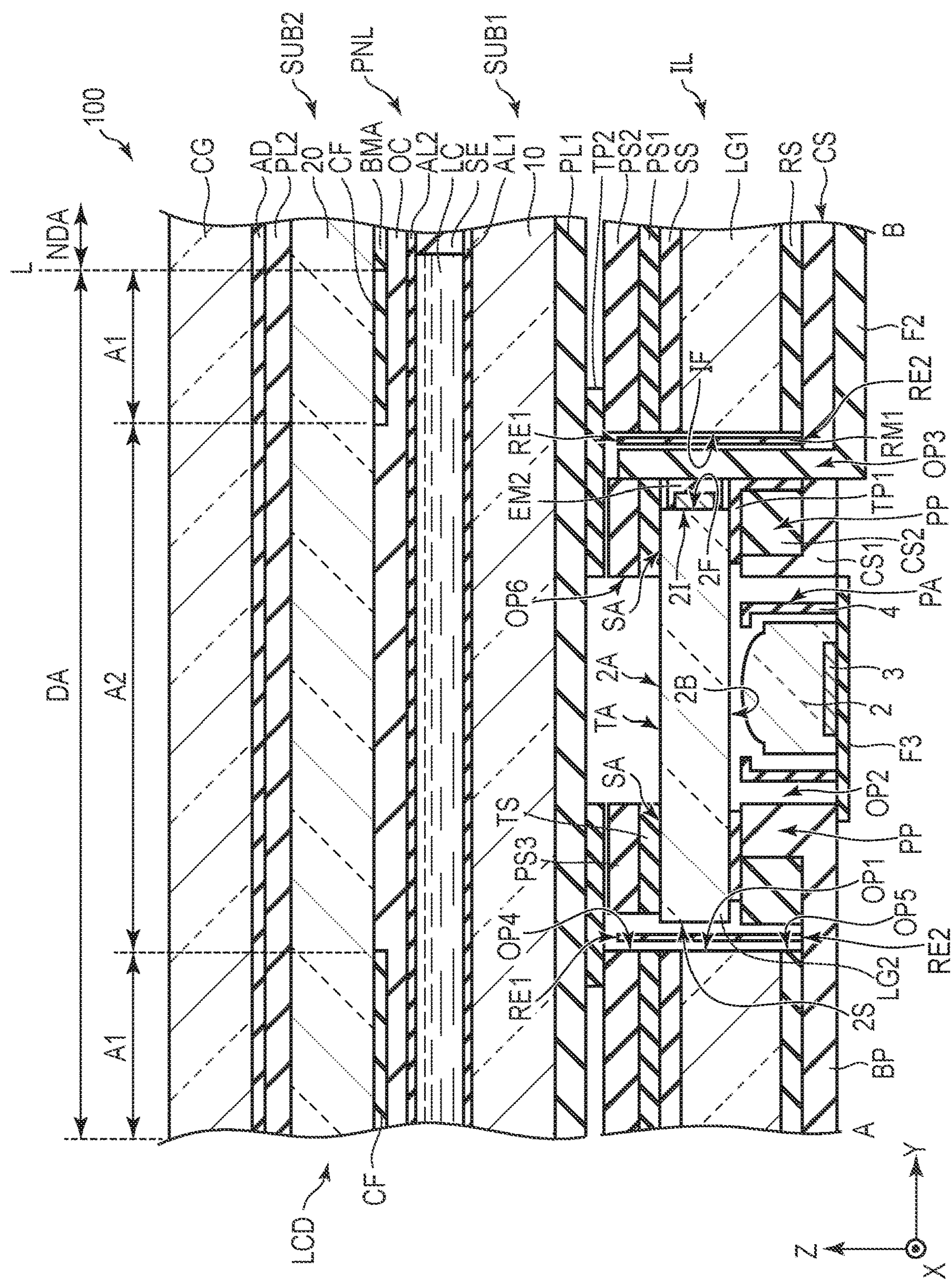
F I G. 3

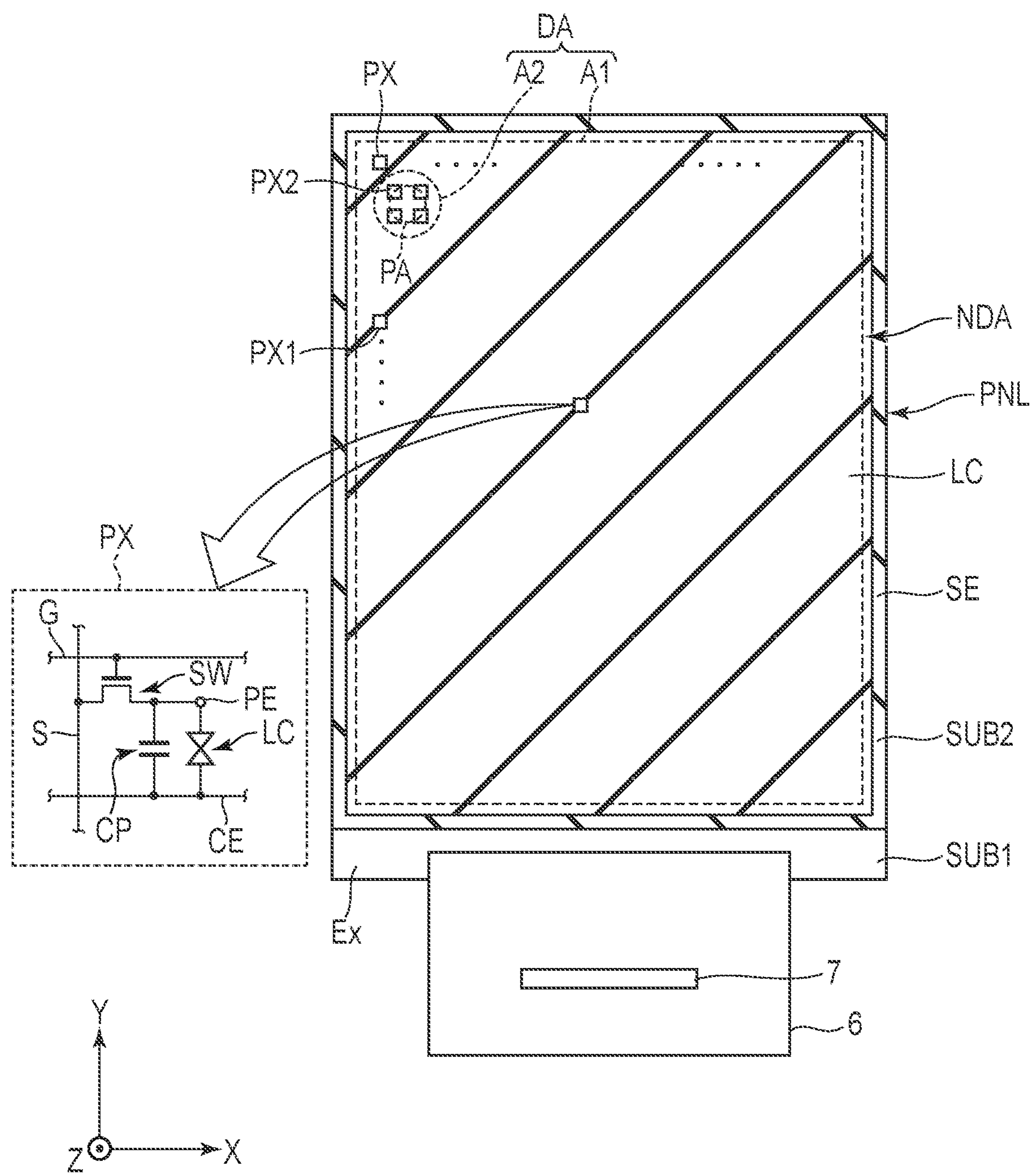
F I G. 4

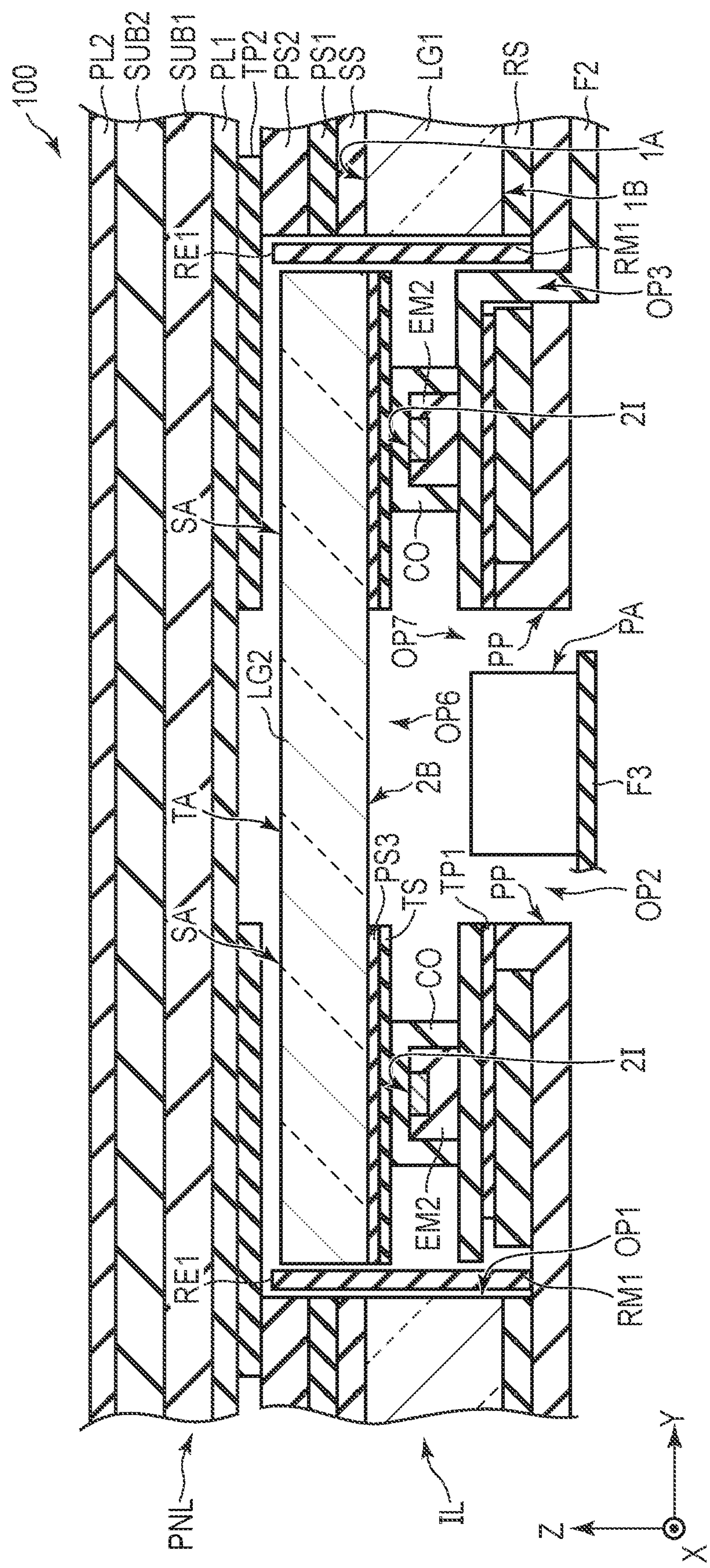
F I G. 8

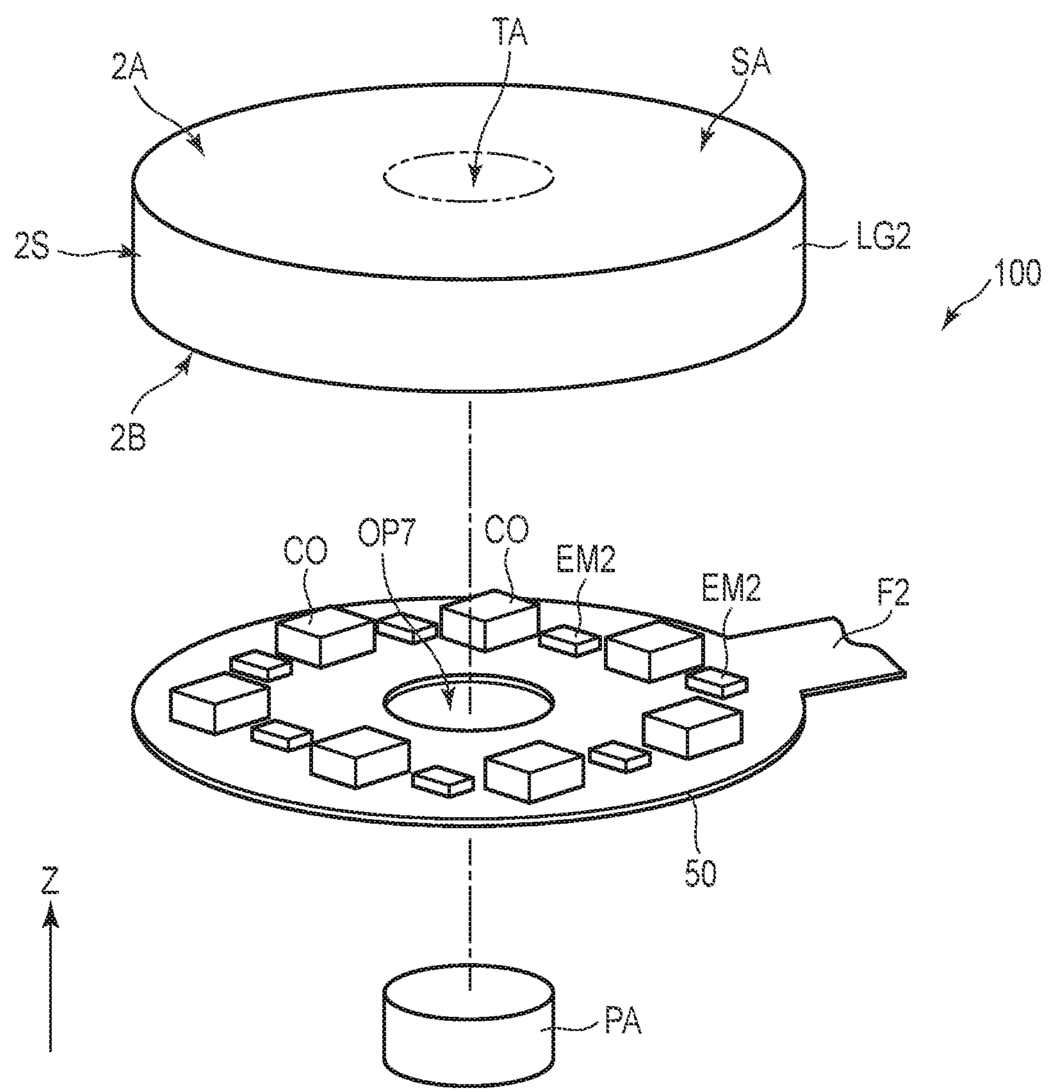
F I G. 9

ELECTRONIC DEVICE COMPRISING ILLUMINATION DEVICE INCLUDING SECOND LIGHT GUIDE FORMED IN AN OPENING

CROSS-REFERENCE TO RELATED APPLICATIONS

This application is a Continuation Application of PCT Application No. PCT/JP2020/007809, filed Feb. 26, 2020 and based upon and claiming the benefit of priority from Japanese Patent Application No. 2019-071355, filed Apr. 3, 2019, the entire contents of all of which are incorporated herein by reference.

FIELD

Embodiments described herein relate generally to an electronic device.

BACKGROUND

In recent years, electronic devices such as smartphones including a display unit and a camera on the same surface side have been widely put into practical use. In such an electronic device, a camera is provided outside a display unit, and there is an increasing demand for reducing a frame width outside the display unit while securing a space for installing the camera.

In addition, it is desired to be able to take clear pictures.

BRIEF DESCRIPTION OF THE DRAWINGS

FIG. 3 is a sectional view of the electronic device taken along the line A-B illustrated in FIG. 2.

FIG. 4 is a plan view illustrating a configuration example of a liquid crystal panel illustrated in FIG. 3.

FIG. 8 is a sectional view illustrating a second configuration example of the electronic device.

FIG. 9 is an exploded perspective view illustrating a part of the electronic device illustrated in FIG. 8.

DETAILED DESCRIPTION

Figure 1:
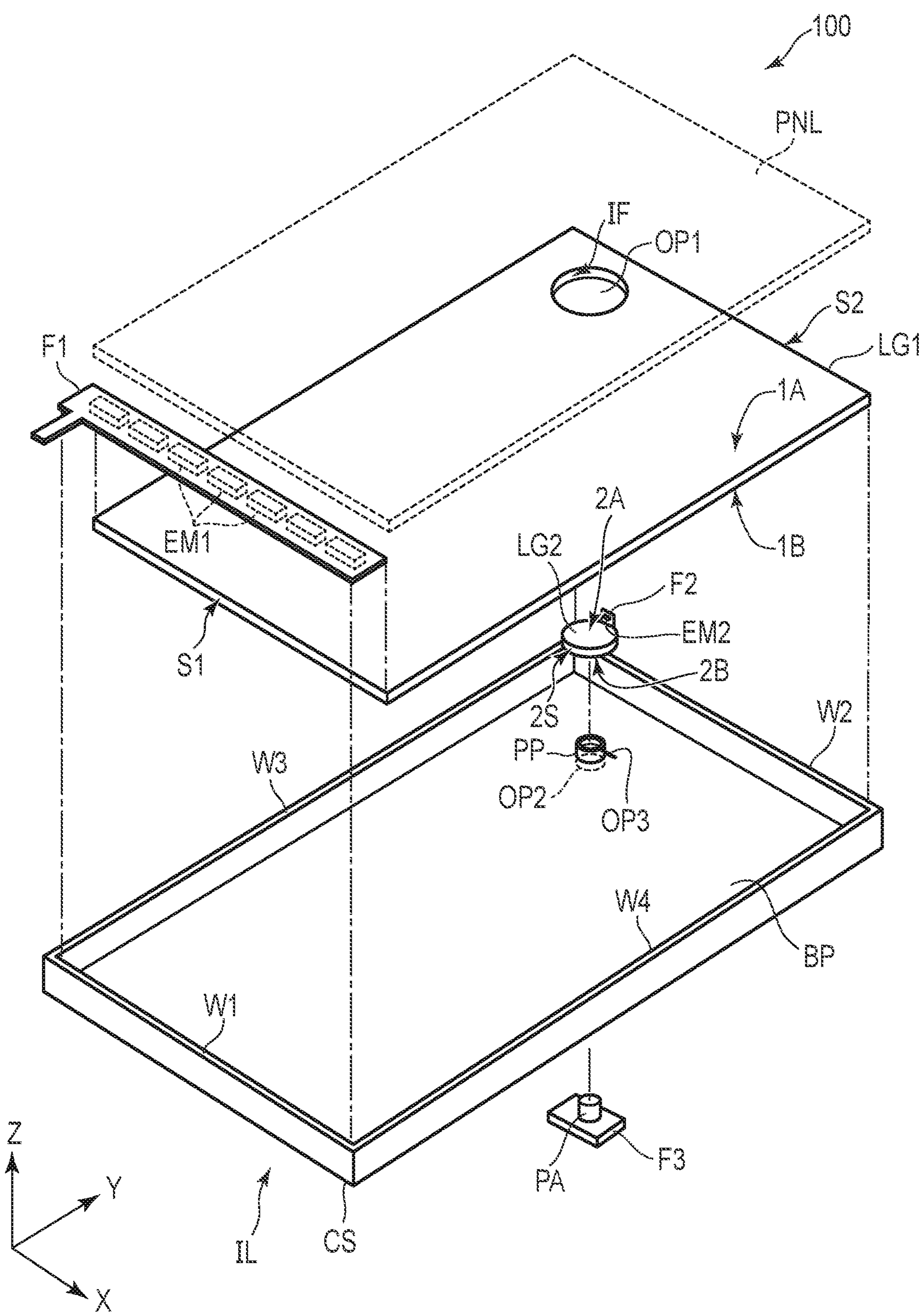
FIG. 1 is an exploded perspective view illustrating a first configuration example of an electronic device including an illumination device according to an embodiment.

In general, according to one embodiment, there is provided an electronic device comprising: a liquid crystal panel; an illumination device configured to illuminate the liquid crystal panel; and a light reflecting material. The illumination device includes a first light guide having an opening, a first light source configured to irradiate the first light guide with light, a second light guide formed in the opening, and a second light source configured to irradiate the second light guide with light. The light reflecting material is located between the first light guide and the second light guide in the opening.

According to another embodiment, there is provided an electronic device comprising: a liquid crystal panel; an illumination device configured to illuminate the liquid crystal panel; and a light reflecting material. The illumination device includes a first light guide, a first light source that faces the first light guide and is configured to irradiate the first light guide with light, a second light guide; and a second light source that faces the second light guide and is configured to irradiate the second light guide with light. The first light guide includes a first main surface opposed to the liquid crystal panel, a second main surface opposed to the first main surface, and an opening penetrating between the first main surface and the second main surface. The second light guide is formed in the opening. The light reflecting material is located between the first light guide and the second light guide in the opening.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

FIG. 1 is an exploded perspective view illustrating a first configuration example of an electronic device 100 including an illumination device IL according to an embodiment.

As illustrated in FIG. 1, the first direction X, the second direction Y, and the third direction Z are orthogonal to each other, but may intersect at an angle other than 90 degrees.

The illumination device IL includes light guides LG1 and LG2, a plurality of light sources EM1, a light source EM2, and a case CS. Such an illumination device IL illuminates, for example, a liquid crystal panel PNL indicated by a dashed line in FIG. 1 in a simplified manner.

The light guide LG1 is formed in a flat plate shape parallel to an X-Y plane defined by the first direction X and the second direction Y. The light guide LG1 faces the liquid crystal panel PNL. The light guide LG1 includes a first main surface 1A, a second main surface 1B facing the first main surface 1A, a side surface S1, a side surface S2 opposite to the side surface S1, and an opening OP1. The first main surface 1A and the second main surface 1B are, for example, surfaces parallel to the X-Y plane. The first main surface 1A faces the liquid crystal panel PNL. The side surfaces S1 and S2 extend along the first direction X, respectively. For example, the side surfaces S1 and S2 are surfaces parallel to an X-Z plane defined by the first direction X and the third direction Z. The opening OP1 is a through hole penetrating the light guide LG1 along the third direction Z. In the illustrated example, the opening OP1 penetrates between the first main surface 1A and the second main surface 1B. The opening OP1 may be a notch recessed from the side surface S2 toward the side surface S1 on the side surface S2. The opening OP1 is located between the side surfaces S1 and S2 in the second direction Y, and is closer to the side surface S2 than the side surface S1. The opening OP1 includes a side surface IF between the first main surface 1A and the second main surface 1B. The side surface IF is a surface exposed through the opening OP1.

The plurality of light sources EM1 is arranged at intervals along the first direction X. Each of the light sources EM1 is mounted on a wiring substrate F1 and electrically connected to the wiring substrate F1.

The light guide LG2 includes a first main surface 2A, a second main surface 2B facing the first main surface 2A, and a side surface 2S located between the first main surface 2A and the second main surface 2B. The first main surface 2A and the second main surface 2B are surfaces parallel to the X-Y plane. The first main surface 2A faces the liquid crystal panel PNL. The light guide LG2 overlaps the opening OP1 in the third direction Z. The light source EM2 is mounted on a wiring substrate F2 and electrically connected to the wiring substrate F2. In the illustrated example, one light source EM2 is provided, but a plurality of light sources EM2 may be arranged at intervals. The light sources EM1 and EM2 are, for example, light emitting diodes (LED).

The case CS accommodates the light guides LG1 and LG2 as well as the light sources EM1 and EM2. The case CS includes side walls W1 to W4, a bottom plate BP, openings OP2 and OP3, and a protrusion PP. The side walls W1 and W2 extend in the first direction X and face each other. The side walls W3 and W4 extend in the second direction Y and face each other. The openings OP2 and OP3 are through holes penetrating the bottom plate BP in the third direction Z, respectively. The openings OP2 and OP3 overlap the opening OP1 in the third direction Z. The opening OP3 is, for example, a through hole through which the wiring substrate F2 passes. The protrusion PP protrudes from the bottom plate BP toward the liquid crystal panel PNL in the third direction Z, and is provided so as to surround the opening OP2.

The electronic device 100 incorporating such an illumination device IL includes a light receiving element PA. The light receiving element PA is provided so as to overlap the opening OP2 in the third direction Z. The light receiving element PA is mounted on a wiring substrate F3 and electrically connected to the wiring substrate F3. The light receiving element PA may be electrically connected to the wiring substrate F2 common to the light source EM2.

The liquid crystal panel PNL overlaps the light guide LG1 and also overlaps the light guide LG2, the light source EM2, the wiring substrate F2, and the light receiving element PA at the opening OP1.

Figure 2:
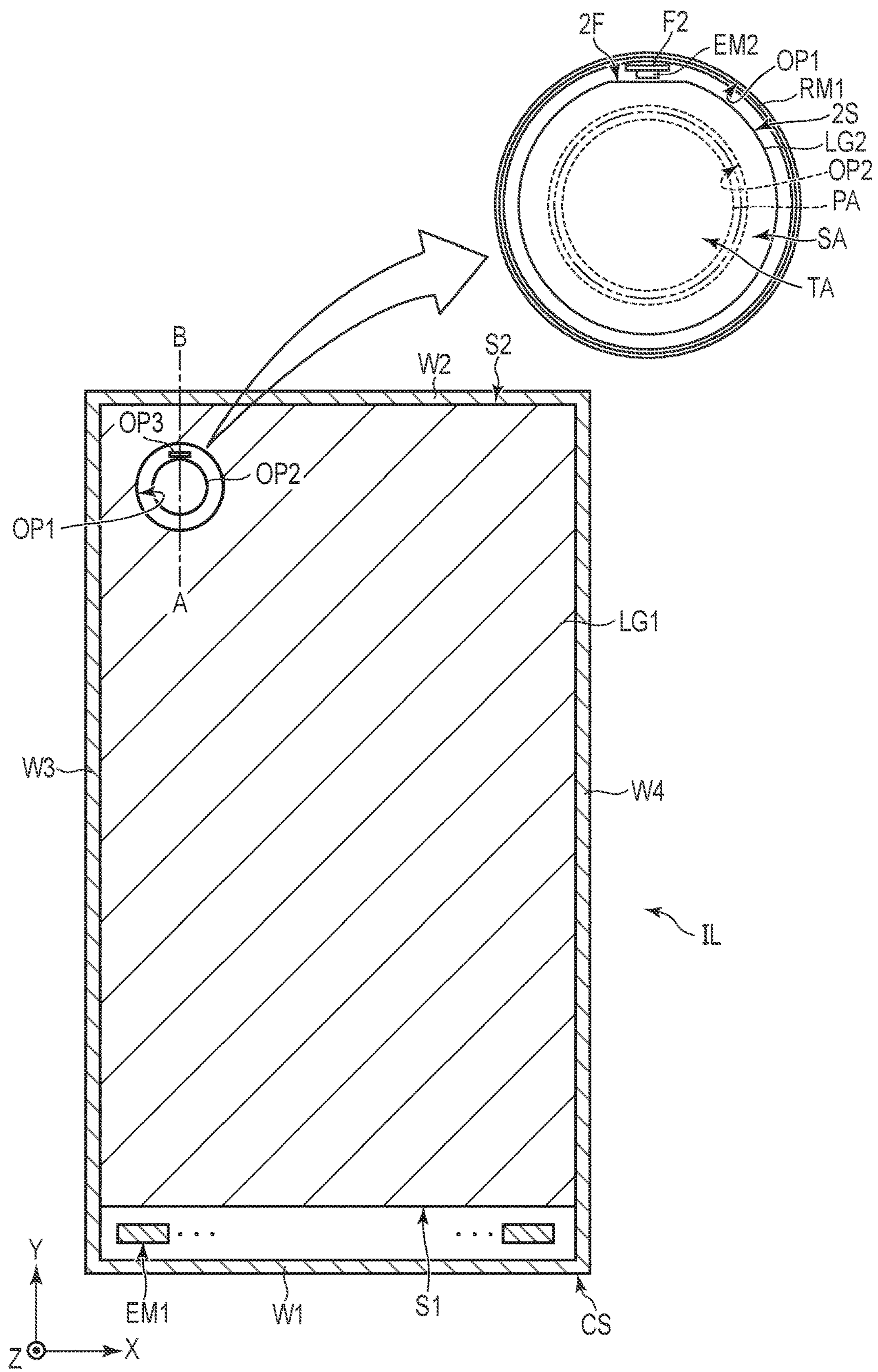
FIG. 2 is a plan view of the illumination device illustrated in FIG. 1.

FIG. 2 is a plan view of the illumination device IL illustrated in FIG. 1. The wiring substrate F1 is not illustrated.

As illustrated in FIG. 2, the openings OP2 and OP3 of the case CS are located inside the opening OP1 of the light guide LG1. In the illustrated example, both the openings OP1 and OP2 have a circular shape in plan view, but may have other shapes such as an oval shape and a polygonal shape.

The illumination device IL further includes a light reflecting material RM1. As illustrated in an enlarged manner in FIG. 2, the light reflecting material RM1, the wiring substrate F2, the light source EM2, the light guide LG2, and the light receiving element PA are formed inside the opening OP1. The light receiving element PA is located inside the opening OP2. The wiring substrate F2, the light source EM2, and the light guide LG2 are located inside the light reflecting material RM1. The light reflecting material RM1 surrounds the side surface 2S of the light guide LG2.

The light source EM2 faces the light guide LG2. The light source EM2 irradiates the light guide LG2 with light. The light guide LG2 has a substantially circular shape in plan view. In the illustrated example, the light guide LG2 includes a light incident surface 2F facing the light source EM2 on the side surface 2S. The light incident surface 2F is, for example, a surface parallel to the X-Z plane. The light guide LG2 includes a transmission area TA and a diffusion area SA surrounding the transmission area TA. The transmission area TA overlaps the light receiving element PA, and the diffusion area SA does not overlap the light receiving element PA.

The light sources EM1 are disposed between the side surface S1 of the light guide LG1 and the side wall W1 of the case CS, and face the side surface S1. The light sources EM1 irradiate the light guide LG1 with light. For example, the illumination light emitted from the light sources EM1 enters the light guide LG1 from the side surface S1, and travels inside the light guide LG1 from the side surface S1 toward the side surface S2 in the second direction Y.

FIG. 3 is a sectional view of the electronic device 100 taken along the line A-B illustrated in FIG. 2. Here, a cross section of the electronic device 100 taken along the second direction Y including the liquid crystal panel PNL, the light receiving element PA, and the illumination device IL is illustrated.

As illustrated in FIG. 3, the illumination device IL further includes a reflection sheet RS, a diffusion sheet SS, prism sheets PS1 to PS3, a wavelength conversion element TS, and a tape TP1.

The reflection sheet RS, the light guide LG1, the diffusion sheet SS, the prism sheet PS1, and the prism sheet PS2 are disposed in this order in the third direction Z and are accommodated in the case CS. The case CS includes a metal case CS1 and a resin pedestal CS2. The pedestal CS2 forms the protrusion PP together with the case CS1. Each of the diffusion sheet SS, the prism sheet PS1, and the prism sheet PS2 has an opening OP4 overlapping the opening OP1. The reflection sheet RS has an opening OP5 overlapping the opening OP1. In the illustrated example, the protrusion PP of the case CS is located inside each of the openings OP1 and OP5.

The light guide LG2 is located between the liquid crystal panel PNL and the light receiving element PA. The tape TP1 is located between the second main surface 2B of the light guide LG2 and the protrusion PP, and between the wiring substrate F2 and the protrusion PP, respectively. The tape TP1 is, for example, a double-sided tape whose both surfaces are adhesive surfaces. The tape TP1 fixes the light guide LG2 to the upper surface of the protrusion PP, and bonds the wiring substrate F2 and the side surface of the protrusion PP together. In addition, since the light guide LG2 overlaps the light receiving element PA, intrusion of foreign matter between the light guide LG2 and the light receiving element PA is suppressed.

The wavelength conversion element TS is located between the light guide LG2 and the liquid crystal panel PNL. The wavelength conversion element TS faces the first main surface 2A of the light guide LG2 in the diffusion area SA. A prism sheet PS3 is located between the wavelength conversion element TS and the liquid crystal panel PNL. Each of the wavelength conversion element TS and the prism sheet PS3 is formed in an annular shape and has an opening OP6 overlapping the opening OP2. The wavelength conversion element TS absorbs light and emits light having a wavelength longer than the wavelength of the absorbed light. The wavelength conversion element TS includes, for example, a quantum dot as a light emitting material, but is not limited thereto, and may include a material that emits fluorescence or phosphorescence. The prism sheet PS3 condenses, for example, the light converted by the wavelength conversion element TS in the third direction Z.

The light source EM2 includes a light emitting surface 2I facing the light incident surface 2F. The light emitting surface 2I is in contact with the light incident surface 2F. The light source EM2 is located between the light reflecting material RM1 and the light guide LG2.

The wiring substrate F2 is located between the light source EM2 and the light reflecting material RM1. The wiring substrate F2 extends to the lower surface side of the case CS through the opening OP3.

The light reflecting material RM1 is located between the wiring substrate F2 and the light guide LG1, and between the light guide LG1 and the light guide LG2. The light reflecting material RM1 faces each of the side surface IF of the first light guide LG1 and the side surface 2S of the second light guide LG2. The light reflecting material RM1 is separated from each of the wiring substrate F2, the reflection sheet RS, the light guide LG1, the diffusion sheet SS, and the prism sheets PS1 and PS2. The light reflecting material RM1 has an end portion RE1 facing the liquid crystal panel PNL and an end portion RE2 opposite to the end portion RE1. In the illustrated example, the end portion RE1 is located inside the opening OP4 and is located between the prism sheet PS2 and the prism sheet PS3. The end portion RE1 is not in contact with a tape TP2. The end portion RE2 is in contact with the bottom plate BP. The side surface IF of the light guide LG1 and the side surface 2S of the light guide LG2 are located between the end portion RE1 and the end portion RE2 in the direction (third direction Z) from the end portion RE1 toward the end portion RE2. The light reflecting material RM1 is, for example, a film formed of a polyester-based resin having a multilayer film structure and reflecting light. In the light reflecting material RM1, a surface facing the side surface IF of the light guide LG1 may be colored in black.

A polarizer PL1, the liquid crystal panel PNL, a polarizer PL2, and a cover glass CG are disposed in this order in the third direction Z, and constitute a liquid crystal element LCD having an optical switch function for light traveling in the third direction Z. The tape TP2 is, for example, a transparent or white double-sided adhesive tape, and bonds the illumination device IL and the liquid crystal element LCD. In the present embodiment, the tape TP2 bonds the polarizer PL1 and the prism sheet PS2. The tape TP2 is not bonded to the prism sheet PS3.

The liquid crystal panel PNL may have any configuration corresponding to a display mode using a lateral electric field along a substrate main surface, a display mode using a vertical electric field along the normal line of the substrate main surface, a display mode using an inclined electric field inclined in an oblique direction with respect to the substrate main surface, and further a display mode using the lateral electric field, the vertical electric field, and the inclined electric field in an appropriate combination. Here, the substrate main surface is a surface parallel to the X-Y plane.

The liquid crystal panel PNL includes a display portion DA that displays an image and a non-display portion NDA that surrounds the display portion DA. The liquid crystal panel PNL includes a first substrate SUB1, a second substrate SUB2, a liquid crystal layer LC, and a sealant SE. The sealant SE is located in the non-display portion NDA, bonds the first substrate SUB1 and the second substrate SUB2, and sealants the liquid crystal layer LC.

Main parts of the first substrate SUB1 and the second substrate SUB2 will be described below. The first substrate SUB1 includes an insulating substrate 10 and an alignment film AL1. The second substrate SUB2 includes an insulating substrate 20, a color filter CF, a light shielding layer BMA, a transparent layer OC, and an alignment film AL2.

The insulating substrates 10 and 20 are transparent substrates such as glass substrates and flexible resin substrates. The alignment films AL1 and AL2 are in contact with the liquid crystal layer LC.

The color filter CF, the light shielding layer BMA, and the transparent layer OC are located between the insulating substrate 20 and the liquid crystal layer LC. In the illustrated example, the color filter CF is provided on the second substrate SUB2, but may be provided on the first substrate SUB1.

The light shielding layer BMA is located in the non-display portion NDA. A boundary L between the display portion DA and the non-display portion NDA is defined by, for example, the inner end (end portion on the display portion DA side) of the light shielding layer BMA. The sealant SE is provided at a position overlapping the light shielding layer BMA.

Although details of the color filter CF are omitted here, the color filter CF includes, for example, a red filter disposed in a red pixel, a green filter disposed in a green pixel, and a blue filter disposed in a blue pixel. In addition, the color filter CF may include a transparent resin layer disposed in a white pixel. The transparent layer OC covers the color filter CF and the light shielding layer BMA. The transparent layer OC is, for example, a transparent organic insulating layer.

The display portion DA includes an area A1 in which the color filter CF is disposed and an area A2 in which the color filter CF is not disposed. The transparent layer OC is disposed over the areas A1 and A2, is in contact with the color filter CF in the area A1, and is in contact with the insulating substrate 20 in the area A2. The alignment film AL1 and the alignment film AL2 are provided over the areas A1 and A2.

In the present embodiment, the light receiving element PA is, for example, a camera. As an example, the light receiving element PA may be one that detects visible light, one that detects infrared light, a proximity sensor that senses the proximity of a detection object, a detection element that detects infrared light reflected from the detection object, or the like, or a combination thereof. The electronic device 100 may include a light emitting element instead of or in addition to the light receiving element PA. Examples of the light emitting element include a projection element that projects infrared light toward a detection object.

The light receiving element PA is provided so as to overlap the opening OP2 of the case CS, and is located on the inner side surrounded by the protrusion PP. The light receiving element PA overlaps the cover glass CG, the polarizer PL2, the liquid crystal panel PNL, the polarizer PL1, and the light guide LG2 in the third direction Z. A part or an entirety of the light receiving element PA overlaps the display portion DA of the liquid crystal panel PNL in the third direction Z. That is, in the electronic device 100 including the liquid crystal panel PNL and the light receiving element PA, the light receiving element PA may be provided on the back side of the liquid crystal panel PNL as viewed from a user of the electronic device 100.

Focusing on the positional relationship between the illustrated light receiving element PA and the display portion DA, the light receiving element PA overlaps the area A2. That is, the color filter CF does not overlap the light receiving element PA.

The light receiving element PA includes, for example, an optical system 2 including at least one lens, an image sensor (imaging element) 3, and a case 4. The case 4 accommodates the optical system 2 and the image sensor 3. The optical system 2 is located between the liquid crystal panel PNL and the image sensor 3. The image sensor 3 receives light via the cover glass CG, the polarizer PL2, the liquid crystal panel PNL, the polarizer PL1, and the light guide LG2. For example, the light receiving element PA receives visible light (for example, light in the range of 400 nm to 700 nm) transmitted through the cover glass CG, the polarizer PL2, the display portion DA, the polarizer PL1, and the light guide LG2. In a case where the absorption axis of the polarizer PL1 and the absorption axis of the polarizer PL2 are orthogonal to each other, when the wavelength of light transmitted through the liquid crystal layer LC of the liquid crystal element LCD is λ, and the retardation of the liquid crystal layer LC is approximately zero or corresponds to λ, the transmittance of the liquid crystal element LCD is minimized. Therefore, when imaging is performed by the light receiving element PA, the retardation of the liquid crystal layer LC is set to be larger than zero and smaller than λ. When the retardation is approximately λ/2, the transmittance of the liquid crystal element LCD is maximized.

The polarizer PL1 is bonded to the insulating substrate 10. The polarizer PL2 is bonded to the insulating substrate 20. The polarizer PL2 is bonded to the cover glass CG by a transparent adhesive layer AD. The polarizers PL1 and PL2 are disposed over the areas A1 and A2. The liquid crystal element LCD may include a retardation film, a scattering layer, an antireflection layer, and the like as necessary.

In order to prevent the liquid crystal layer LC from being affected by an external electric field or the like, a transparent conductive film may be provided between the polarizer PL2 and the insulating substrate 20. The transparent conductive film is made of a transparent oxide conductor such as indium tin oxide (ITO) or indium zinc oxide (IZO). In a case where a sensor is used for the light receiving element PA and the transparent conductive film causes a decrease in the infrared light transmittance, it is possible to suppress a decrease in the visible light transmittance by providing an area where the transparent conductive film is not formed in the area A2 overlapping the sensor. It is also possible to make the area where the transparent conductive film is not formed wider than the area A2. A transparent conductive film may be formed at a portion overlapping the light receiving element PA for visible light where the infrared light transmittance does not cause a problem. When a conductive resin having a higher infrared light transmittance than the oxide conductor is used as the transparent conductive film, the transparent conductive film can be provided in an area overlapping the light receiving element PA.

The polarizer PL1 or the polarizer PL2 may include a super birefringent film. It is known that the super birefringent film forms transmitted light into non-polarized light (natural light) when linearly polarized light is incident, and even if a material that emits polarized light is included in a subject, imaging can be performed without a sense of discomfort. For example, in a case where the electronic device 100 or the like is reflected as the subject for the light receiving element PA, since the linearly polarized light is emitted from the electronic device 100, the brightness of the electronic device 100 being the subject incident on the light receiving element PA changes due to the relationship between the polarizers PL1 and PL2 and an angle of a polarizer of the electronic device 100 being the subject, and there is a possibility that a sense of discomfort occurs at the time of imaging. However, by providing the super birefringent films in the polarizers PL1 and PL2, it is possible to suppress a change in brightness that causes a sense of discomfort.

As the film exhibiting super birefringence, for example, COSMOSHINE (registered trademark) manufactured by TOYOBO CO., LTD., or the like is suitably used. Here, the super birefringence refers to those having a retardation of 800 nm or more in an in-plane direction with respect to light in a visible range of, for example, 500 nm.

In the illumination device IL, the reflection sheet RS, the light guide LG1, the diffusion sheet SS, the prism sheets PS1 and PS2, the light sources EM1, and the wiring substrate F1 constitute a main illumination unit. On the other hand, in the illumination device IL, the light guide LG2, the wavelength conversion element TS, the prism sheet PS3, the light source EM2, and the wiring substrate F2 constitute a sub-illumination unit.

FIG. 4 is a plan view illustrating a configuration example of the liquid crystal panel PNL illustrated in FIG. 3. In FIG. 4, the liquid crystal layer LC and the sealant SE are indicated by different oblique lines. The outer shape of the light receiving element PA is indicated by a dashed line.

As illustrated in FIG. 4, the display portion DA is a substantially quadrangular area not including a notch, but four corners may be rounded, or the display portion DA may have a polygonal shape or a circular shape other than the quadrangle. The display portion DA is located on the inner side surrounded by the sealant SE.

The liquid crystal panel PNL includes a plurality of pixels PX arranged in a matrix in the first direction X and the second direction Y in the display portion DA. Each pixel PX in the display portion DA has the same circuit configuration. As illustrated in an enlarged manner in FIG. 4, each pixel PX includes a switching element SW, a pixel electrode PE, a common electrode CE, a liquid crystal layer LC, and the like. The switching element SW includes, for example, a thin film transistor (TFT), and is electrically connected to a scanning line G and a signal line S. A control signal for controlling the switching element SW is supplied to the scanning line G. A video signal is supplied to the signal line S as a signal different from the control signal. The pixel electrode PE is electrically connected to the switching element SW. The liquid crystal layer LC is driven by an electric field generated between the pixel electrode PE and the common electrode CE. A capacitance CP is formed, for example, between an electrode having the same potential as the common electrode CE and an electrode having the same potential as the pixel electrode PE.

A wiring substrate 6 is mounted on an extending portion Ex of the first substrate SUB1 and is electrically connected thereto. An IC chip 7 is mounted on the wiring substrate 6 and is electrically connected to the wiring substrate 6. The IC chip 7 may be mounted on the extending portion Ex and electrically connected to the extending portion Ex. The IC chip 7 incorporates, for example, a display driver that outputs a signal necessary for image display. The wiring substrate 6 is a bendable flexible printed circuit.

In the display portion DA, the pixel PX1 that does not overlap the light receiving element PA corresponds to a pixel in the area A1 illustrated in FIG. 3, and includes the color filter CF. That is, the pixel PX1 can display any color of red, green, and blue. Further, in a case where the pixel PX1 is a white pixel, the pixel PX1 can display any one of white (or transparent), gray, and black. The pixel PX1 is disposed over the entire area overlapping the light guide LG1 in the display portion DA. Further, the pixel PX1 may be disposed in an area that does not overlap the light receiving element PA in the area A2.

In the display portion DA, the pixel PX2 overlapping the light receiving element PA corresponds to a pixel in the area A2 illustrated in FIG. 3, and does not include the color filter CF. That is, the pixel PX2 is a monochrome display pixel, and can display any one of white (or transparent), gray, and black. Ideally, the pixel PX2 overlaps the optical system 2 including the lens of the light receiving element PA in plan view, but may overlap the case 4 of the light receiving element PA.

The light receiving element PA overlaps the liquid crystal panel PNL. Specifically, the light receiving element PA overlaps the display portion DA of the liquid crystal panel PNL. Therefore, the display portion DA can be enlarged. In addition, since it is not necessary to provide a space for installing the light receiving element PA in the non-display portion NDA, the frame width of the non-display portion NDA can be reduced.

Figure 5:
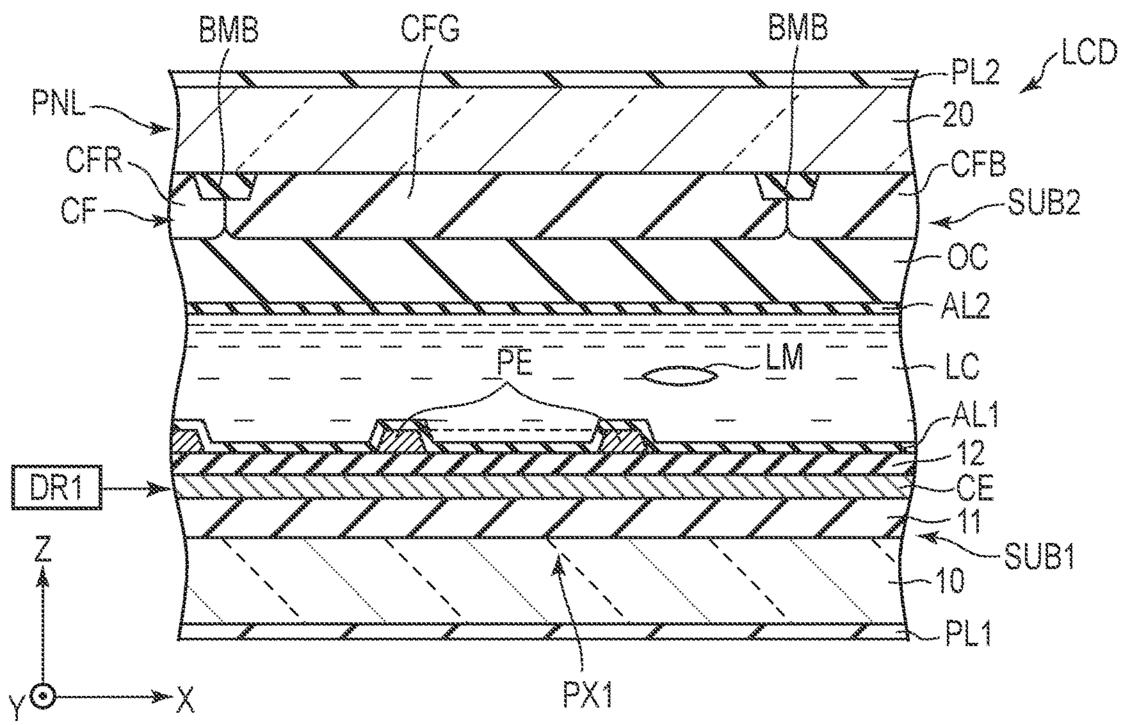
FIG. 5 is a sectional view of a liquid crystal element including a pixel PX1 illustrated in FIG. 4.

FIG. 5 is a sectional view of the liquid crystal element LCD including the pixel PX1 illustrated in FIG. 4. Here, the liquid crystal element LCD including the liquid crystal panel PNL corresponding to the display mode using a lateral electric field between the polarizer PL1 and the polarizer PL2 will be described.

As illustrated in FIG. 5, the first substrate SUB1 includes insulating layers 11 and 12, the common electrode CE, and the pixel electrodes PE between the insulating substrate 10 and the alignment film AL1. The scanning line G, the signal line S, and the switching element SW illustrated in FIG. 4 are located, for example, between the insulating substrate 10 and the common electrode CE. The common electrode CE is located on the insulating layer 11 and covered with the insulating layer 12. The pixel electrodes PE are located on the insulating layer 12 and covered with the alignment film AL1. Each of the pixel electrodes PE faces the common electrode CE through the insulating layer 12. The common electrode CE and the pixel electrodes PE are made of a transparent conductive material such as indium tin oxide (ITO) or indium zinc oxide (IZO). The pixel electrode PE is a linear electrode, and the common electrode CE is a flat plate electrode provided in common over the plurality of pixels PX1. The pixel electrode PE may be a flat plate electrode, and a linear common electrode may be provided between the pixel electrode PE and the liquid crystal layer LC. Although not described in detail, the insulating layer 11 includes an inorganic insulating layer and an organic insulating layer. The insulating layer 12 is, for example, an inorganic insulating layer such as silicon nitride.

In the second substrate SUB2, the light shielding layers BMB are integrally formed with the light shielding layer BMA in the non-display portion NDA illustrated in FIG. 3. The color filter CF includes a red filter CFR, a green filter CFG, and a blue filter CFB. The green filter CFG faces the pixel electrodes PE. The red filter CFR and the blue filter CFB also face other pixel electrodes PE (not illustrated), respectively.

A driver DR1 that drives the liquid crystal element LCD includes, for example, a scanning line driving circuit electrically connected to the scanning line G illustrated in FIG. 4 and a signal line driving circuit electrically connected to the signal line S. The driver DR1 outputs a signal necessary for image display to each pixel PX of the display portion DA, and controls the transmittance of the liquid crystal element LCD. The transmittance of the liquid crystal element LCD is controlled according to the magnitude of the voltage applied to the liquid crystal layer LC.

For example, in an OFF state in which no voltage is applied to the liquid crystal layer LC in the pixel PX1, a liquid crystal molecule LM included in the liquid crystal layer LC is initially aligned in a predetermined direction between the alignment films AL1 and AL2. In such an OFF state, the light guided from the light sources EM1 illustrated in FIG. 1 to the pixel PX1 is absorbed by the polarizers PL1 and PL2. Therefore, the liquid crystal element LCD displays black in the pixel PX1 in the OFF state.

On the other hand, in an ON state in which the voltage is applied to the liquid crystal layer LC, the liquid crystal molecule LM is aligned in a direction different from the initial alignment direction by the electric field formed between the pixel electrode PE and the common electrode CE, and the alignment direction is controlled by the electric field. In such an ON state, part of the light guided to the pixel PX1 is transmitted through the polarizers PL1 and PL2. Therefore, the liquid crystal element LCD displays the color corresponding to the color filter CF in the pixel PX1 in the ON state.

The above example corresponds to a so-called normally black mode in which black is displayed in the OFF state, but a normally white mode in which black is displayed in the ON state (white is displayed in the OFF state) may be applied.

Figure 6:
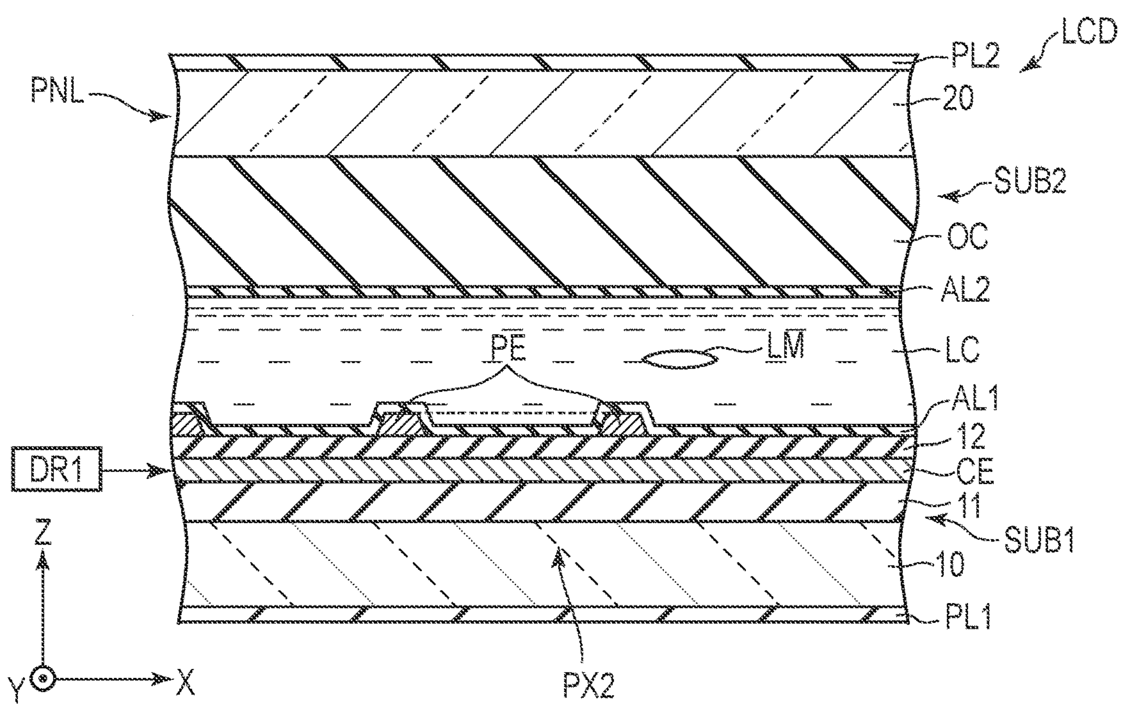
FIG. 6 is a sectional view of the liquid crystal element including a pixel PX2 illustrated in FIG. 4.

FIG. 6 is a sectional view of the liquid crystal element LCD including the pixel PX2 illustrated in FIG. 4.

As illustrated in FIG. 6, the pixel PX2 is different from the pixel PX1 illustrated in FIG. 5 in that the second substrate SUB2 does not include the color filter CF and the light shielding layer BMB. That is, the transparent layer OC is in contact with the insulating substrate 20 immediately above the pixel electrodes PE. In order to adjust the thickness of the transparent layer OC, a transparent resin layer may be provided between the transparent layer OC and the insulating substrate 20.

The transmittance of the liquid crystal element LCD in the pixel PX2 is controlled by the driver DR1 similarly to the pixel PX1. That is, similarly to the pixel PX1, the liquid crystal element LCD has the minimum transmittance in the pixel PX2 in the OFF state in which no voltage is applied to the liquid crystal layer LC, and displays black.

On the other hand, in the ON state in which the voltage is applied to the liquid crystal layer LC, part of the light guided to the pixel PX2 is transmitted through the polarizers PL1 and PL2. The liquid crystal element LCD displays white or enters the transparent state in the case of the maximum transmittance in the pixel PX2 in the ON state. As described above, the liquid crystal element LCD is controlled so as to have the intermediate transmittance between the minimum transmittance and the maximum transmittance, and may display gray. Although the common electrode CE is formed in a flat plate shape in FIG. 6, the pixel PX2 may have a configuration in which openings are provided in the common electrode CE. In the case of a configuration in which the pixel electrodes PE are provided closer to the insulating substrate 10 than the common electrode CE, an opening may be provided in the pixel electrode PE. Furthermore, the pixel electrodes PE and the common electrode CE may be linear electrodes. In this case, it is also possible to provide the linear pixel electrodes PE and the linear common electrode CE in the same layer. In addition, it is also possible to provide the pixel electrodes PE and the common electrode CE in separate layers through an insulating layer. In the case of forming a liquid crystal lens using the liquid crystal layer LC, the degree of freedom of the lens characteristic can be enhanced in the case of forming the lens with the linear pixel electrode PE and the linear common electrode CE as compared to the case of forming the lens with the flat plate electrode and the linear electrode.

Figure 7:
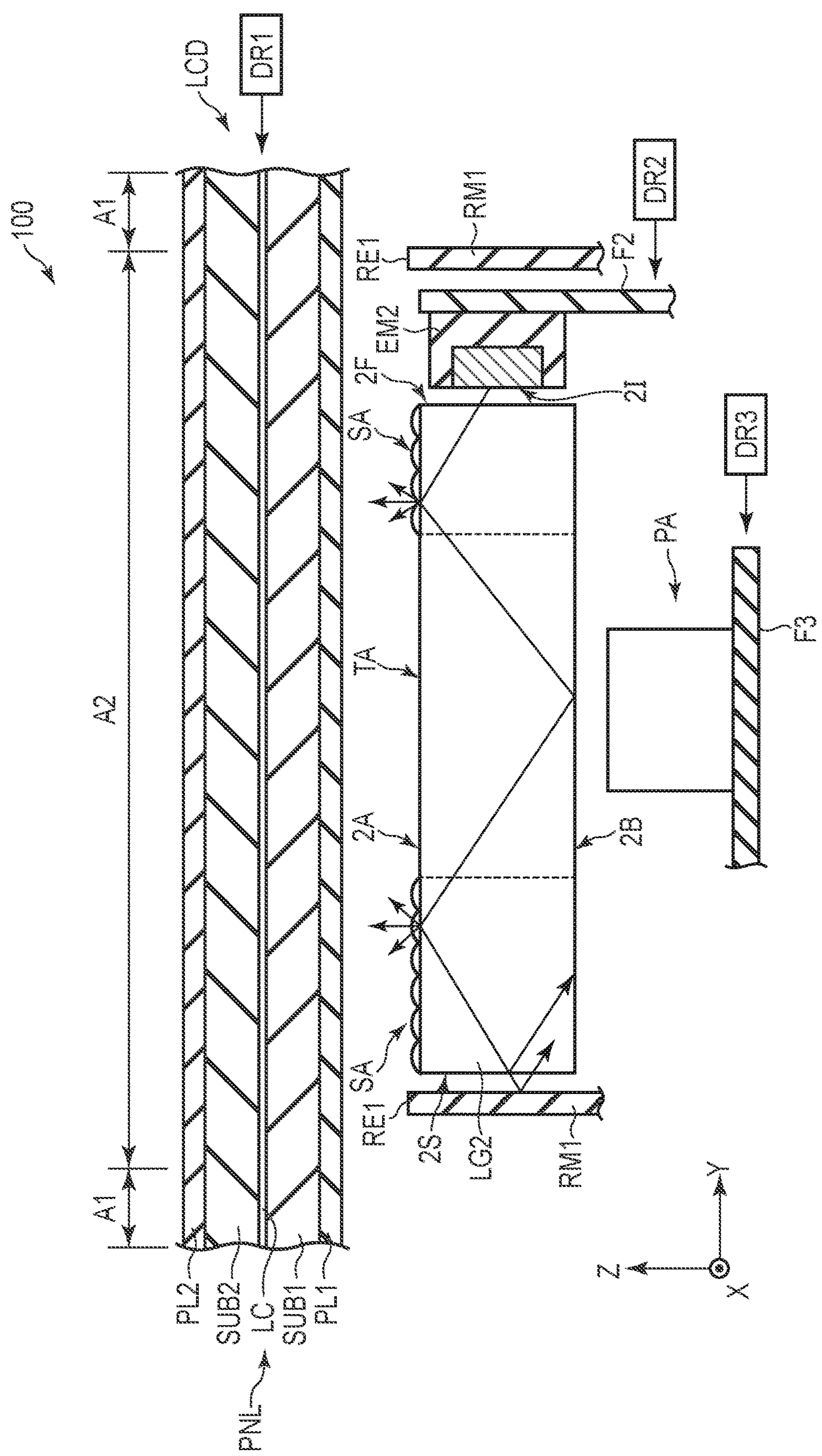
FIG. 7 is a sectional view illustrating a part of the electronic device of the above embodiment, and is a view for explaining a method of driving the electronic device.

FIG. 7 is a sectional view illustrating a part of the electronic device 100 of the above embodiment, and is a view for explaining a method of driving the electronic device 100. In FIG. 7, only the main part of the electronic device 100 is illustrated, and the wavelength conversion element TS, the prism sheet PS3, and the like are not illustrated.

As illustrated in FIG. 7, the light source EM2 is controlled by the driver DR2, and the light receiving element PA is controlled by a driver DR3.

The first main surface 2A of the light guide LG2 is an uneven surface in the diffusion area SA. For example, the first main surface 2A has a dot pattern in the diffusion area SA. However, the uneven surface may be formed with a pattern other than the dot pattern. The light emitted from the light source EM2 is incident on the light guide LG2 from the light incident surface 2F and travels in the light guide LG2. Of the light traveling in the light guide LG2, part of the light traveling to the first main surface 2A in the diffusion area SA is diffused and travels between the first main surface 2A and the liquid crystal element LCD. Of the light traveling in the light guide LG2, the light in the transmission area TA is reflected by the first main surface 2A and the second main surface 2B, and travels in the light guide LG2. Of the light traveling in the light guide LG2, the light emitted from the side surface 2S is reflected by the light reflecting material RM1 and is incident on the light guide LG2 again.

Next, an example of control by the drivers DR1 to DR3 will be described.

When the light receiving element PA is used, the driver DR1 performs control such that at least the area A2 becomes a transparent state in the liquid crystal element LCD. Preferably, the retardation of the liquid crystal layer LC is set to approximately λ/2, and the transmittance of the liquid crystal element LCD is controlled to be maximum.

The driver DR2 performs control such that the light source EM2 is turned off.

The driver DR3 controls the light receiving element PA to receive light through the liquid crystal element LCD and the light guide LG2. For example, in a case where the light receiving element PA is a camera, imaging is performed by the camera, and in a case where the light receiving element PA is a sensor, sensing is performed by the sensor. With such control, there is no influence of the illumination light from the light source EM2 at the time of imaging by the camera or sensing by the sensor. In addition, since the light reflecting material RM1 is provided between the light guide LG1 and the light guide LG2, it is possible to prevent the illumination light emitted from the light sources EM1 from traveling in the light guide LG1 and entering the light guide LG2 when the light receiving element PA is activated.

When the light receiving element PA is not used, the illumination light emitted from the light sources EM1 illustrated in FIG. 2 illuminates the area A1 of the liquid crystal panel PNL through the light guide LG1. However, it is difficult for the illumination light emitted from the light sources EM1 to illuminate the area A2 through the light guide LG1. The driver DR2 performs control such that the light source EM2 is turned on. As a result, the illumination light emitted from the light source EM2 illuminates the area A2 of the liquid crystal element LCD by the light guide LG2. Therefore, in the illumination device IL, the non-uniformity of the luminance of the illumination light due to the opening OP1 provided in the light guide LG1 can be alleviated. Then, the illumination device IL can selectively illuminate the area A1 and the area A2. Therefore, it is possible to obtain the illumination device IL capable of selecting an area to be illuminated in the liquid crystal panel PNL. Furthermore, the driver DR1 controls the pixel PX2 in the area A2, so that an image can be displayed in the area A2.

According to the present embodiment, the illumination device IL can selectively illuminate the area A1 and the area A2. The liquid crystal panel PNL is not open in the area A2. The liquid crystal panel PNL has the pixels PX in both the area A1 and the area A2. When displaying an image, the illumination device IL can illuminate both the area A1 and the area A2. An image can be displayed not only in the area A1 but also in the area A2. When the light receiving element PA is activated, the illumination device IL illuminates the area A1 and does not illuminate the area A2. Therefore, the illumination device IL can be controlled so as not to hinder the function of the light receiving element PA.

In addition, the light reflecting material RM1 is located between the light guide LG1 and the light guide LG2 at the opening OP1, and faces each of the side surface IF of the light guide LG1 and the side surface 2S of the light guide LG2. As a result, it is possible to prevent the illumination light emitted from the light sources EM1 from traveling in the light guide LG1 and entering the light guide LG2 when the light receiving element PA is activated. Furthermore, the light leaking from the light guide LG2 while traveling in the light guide LG2 is reflected by the light reflecting material RM1 and returns to the light guide LG2, whereby the luminance of the illumination light in the area A2 can be improved as compared with the case of absorbing the light leaking from the light guide LG2, and the difference between the luminance of the illumination light in the area A2 and the luminance of the illumination light in the area A1 can be alleviated.

In the first configuration example, the light guide LG1 corresponds to a first light guide, the light guide LG2 corresponds to a second light guide, the light source EM1 corresponds to a first light source, and the light source EM2 corresponds to a second light source.

Next, a second configuration example of the electronic device 100 will be described with reference to FIGS. 8 and 9.

FIG. 8 is a sectional view illustrating the second configuration example of the electronic device 100.

As illustrated in FIG. 8, the second configuration example is different from the first configuration example in that the illumination device IL further includes cushioning materials CO, and the light sources EM2 and the wiring substrate F2 face the second main surface 2B of the light guide LG2.

The wiring substrate F2 is located between the light guide LG2 and the protrusion PP. The wiring substrate F2 has an opening OP7 overlapping the opening OP2. The plurality of light sources EM2 and the plurality of cushioning materials CO are mounted on the wiring substrate F2. The light sources EM2 are located between the second main surface 2B and the wiring substrate F2. The light emitting surfaces 2I of the light sources EM2 face the second main surface 2B. For example, the light emitting surface 2I is disposed such that the light of the light source EM2 is emitted in a direction from the second main surface 1B toward the first main surface 1A.

The wavelength conversion element TS is located between the light guide LG2 and the light sources EM2. The wavelength conversion element TS faces the second main surface 2B in a diffusion area SA. The wavelength conversion element TS is in contact with the cushioning materials CO and is not in contact with the light sources EM2. The cushioning materials CO are located between the wavelength conversion element TS and the wiring substrate F2. In the third direction Z, the height of the light source EM2 is lower than the height of the cushioning material CO. As a result, when an impact such as a pressing force is applied to the electronic device 100 from the outside, the cushioning materials CO maintain the distance between the wavelength conversion element TS and the wiring substrate F2, so that damage to the light sources EM2 due to the impact such as the pressing force can be suppressed.

FIG. 9 is an exploded perspective view illustrating a part of the electronic device 100 illustrated in FIG. 8.

As illustrated in FIG. 9, the side surface 2S of the light guide LG2 does not have the light incident surface 2F. The wiring substrate F2 has a ring portion 50. The ring portion 50 has the opening OP7 overlapping the light receiving element PA. Around the opening OP7, the light sources EM2 and the cushioning materials CO are alternately arranged on the ring portion 50 at intervals. The plurality of light sources EM2 and the plurality of cushioning materials CO are located between the ring portion 50 of the wiring substrate F2 and the second main surface 2B of the light guide LG2.

Also in the second configuration example, the same effects as those of the first configuration example can be obtained.

Figure 10:
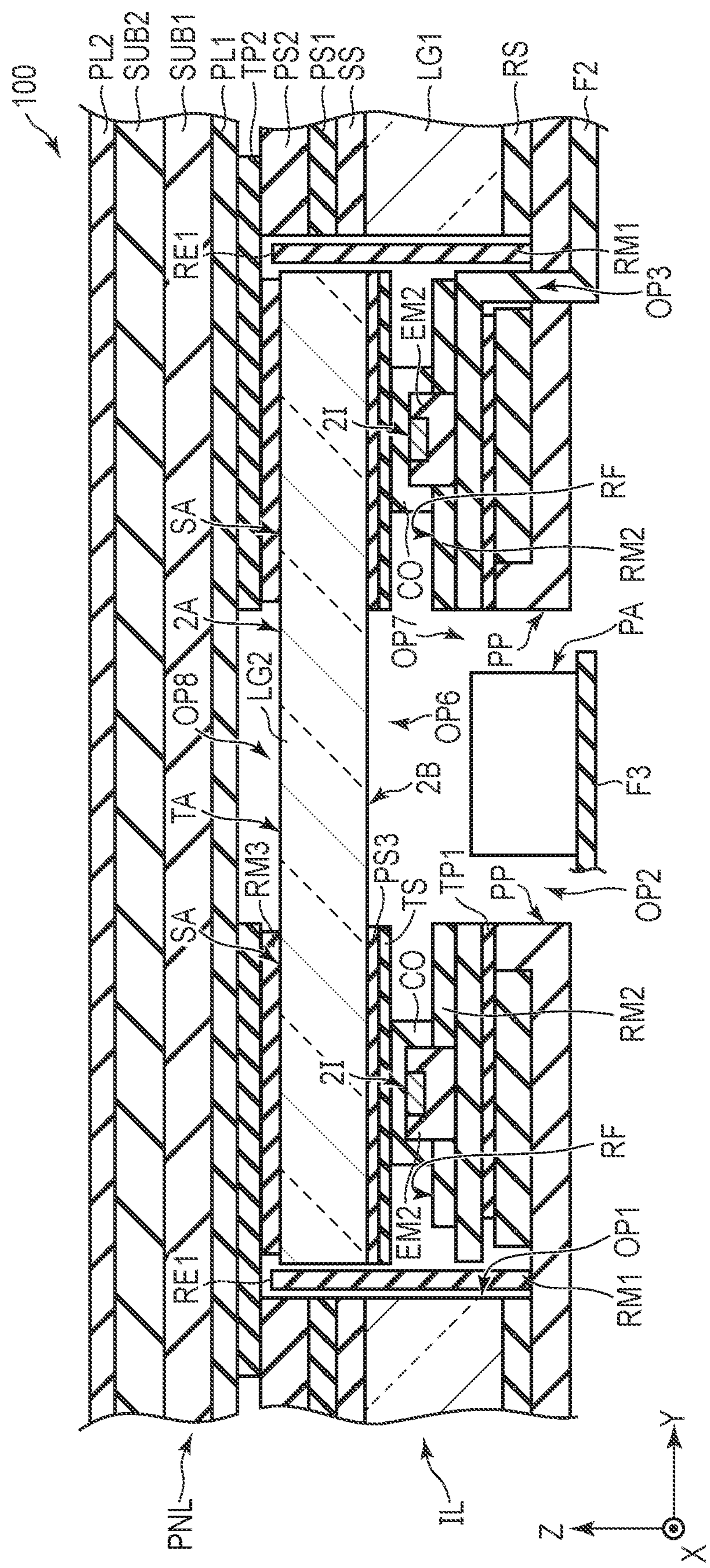
FIG. 10 is a sectional view illustrating a modification of the second configuration example of the electronic device.

FIG. 10 is a sectional view illustrating a modification of the second configuration example of the electronic device 100.

As illustrated in FIG. 10, the modification of the second configuration example is different from the second configuration example in that the illumination device IL further includes a light reflecting material RM2 and a light reflecting material RM3.

The light reflecting material RM2 overlaps the diffusion area SA and is located between the light guide LG2 and the wiring substrate F2. In the illustrated example, the light reflecting material RM2 is provided on the wiring substrate F2. The light reflecting material RM2 includes a reflecting surface RF facing the second main surface 2B. The reflecting surface RF is closer to the wiring substrate F2 than the light emitting surface 2I. As a result, as compared with a case where the light reaching the wiring substrate F2 of the light emitted from the light sources EM2 is absorbed by the wiring substrate F2, the light traveling toward the wiring substrate F2 is reflected by the light reflecting material RM2, so that it is possible to suppress a decrease in light utilization efficiency. The light reflecting material RM2 is formed of, for example, the same material as the light reflecting material RM1.

The light reflecting material RM3 is located between the first main surface 2A of the light guide LG2 and the liquid crystal panel PNL. The light reflecting material RM3 overlaps the diffusion area SA. The light reflecting material RM3 is formed of, for example, white polyethylene terephthalate, and improves the luminance of the light diffused by the diffusion area SA of the light traveling in the light guide LG2.

Also in the modification of the second configuration example, the same effects as those of the second configuration example can be obtained.

As described above, according to the present embodiment, it is possible to provide an electronic device incorporating an illumination device capable of improving luminance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the diffusion area SA of the light guide LG2, the uneven surface may be formed not on the first main surface 2A but on the second main surface 2B. Alternatively, in the diffusion area SA of the light guide LG2, the uneven surfaces may be formed on both the first main surface 2A and the second main surface 2B. The uneven surface may be formed on a surface other than the light incident surface 2F in the side surface 2S.

The above-described embodiment and modification can be applied not only to a liquid crystal display device but also to various electronic devices.

What is claimed is:

1. An electronic device comprising:
a liquid crystal panel;
an illumination device configured to illuminate the liquid crystal panel; and
a light reflecting material,
wherein
the illumination device includes:
a first light guide having an opening;
a first light source configured to irradiate the first light guide with light;
a second light guide formed in the opening; and
a second light source configured to irradiate the second light guide with light, and wherein
the light reflecting material is located between the first light guide and the second light guide in the opening,
the second light guide includes a first main surface opposed to the liquid crystal panel and a second main surface opposed to the first main surface, and
a light emitting surface of the second light source is disposed to face the second main surface.

2. The electronic device according to claim 1, further comprising
a light receiving element that overlaps the liquid crystal panel and the second light guide and receives light through the liquid crystal panel.

3. The electronic device according to claim 1, wherein
the second light source is located between the light reflecting material and the second light guide.

4. The electronic device according to claim 1, wherein
the second light guide includes a first main surface opposed to the liquid crystal panel, a second main surface opposed to the first main surface, and a side surface between the first main surface and the second main surface, and
the light reflecting material is disposed to face the side surface.

5. An electronic device comprising:
a liquid crystal panel;
an illumination device configured to illuminate the liquid crystal panel; and a light reflecting material, wherein the illumination device includes:

a first light guide;

a first light source that faces the first light guide and is configured to irradiate the first light guide with light;

a second light guide; and a second light source that faces the second light guide and is configured to irradiate the second light guide with light, the first light guide includes a first main surface opposed to the liquid crystal panel, a second main surface opposed to the first main surface, and an opening penetrating between the first main surface and the second main surface, the second light guide is formed in the opening, and the light reflecting material is located between the first light guide and the second light guide in the opening.

6. The electronic device according to claim 5, comprising a light receiving element that overlaps the liquid crystal panel and the second light guide and is configured to receive light through the liquid crystal panel.

7. The electronic device according to claim 5, wherein the second light source is located between the light reflecting material and the second light guide.

8. The electronic device according to claim 5, wherein a light emitting surface of the second light source is disposed so as to emit light in a direction from the second main surface toward the first main surface.

9. The electronic device according to claim 5, wherein the opening includes a side surface between the first main surface and the second main surface, and the light reflecting material is disposed to face the side surface.

* * * * *